US010696514B2

(12) United States Patent
Good

(10) Patent No.: US 10,696,514 B2
(45) Date of Patent: Jun. 30, 2020

(54) CABLE REEL WITH BARREL STORAGE

(71) Applicant: NEXANS, Courbevoie (FR)

(72) Inventor: Paul Michael Good, New Holland, PA (US)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 16/149,592

(22) Filed: Oct. 2, 2018

(65) Prior Publication Data
US 2020/0102182 A1 Apr. 2, 2020

(51) Int. Cl.
B65H 75/22 (2006.01)
B65H 75/14 (2006.01)

(52) U.S. Cl.
CPC ............. B65H 75/22 (2013.01); B65H 75/14 (2013.01); B65H 75/141 (2013.01); B65H 2701/533 (2013.01)

(58) Field of Classification Search
CPC ............................ B65H 75/14; B65H 75/141; B65H 2701/533; B65H 75/22
See application file for complete search history.

(56) References Cited

U.S. PATENT DOCUMENTS

| | | | | |
|---|---|---|---|---|
| 1,861,294 A * | 5/1932 | Bartlett | .................. | B65D 59/04 206/226 |
| 2,393,613 A * | 1/1946 | Combs | ................. | B65H 75/406 242/395.1 |
| 5,695,148 A * | 12/1997 | Christensen | ........... | B65H 75/18 242/405.3 |
| 6,467,623 B1 * | 10/2002 | Lewis | ..................... | A47F 5/025 206/388 |
| 6,758,314 B2 * | 7/2004 | Woodruff | ............... | B65H 75/40 191/12.2 R |
| 7,252,193 B1 * | 8/2007 | Lewis | ..................... | B25H 3/02 206/225 |
| 8,074,916 B2 * | 12/2011 | Penumatcha | .......... | B65H 75/14 242/604 |
| 8,480,023 B2 * | 7/2013 | Penumatcha | .......... | B65H 75/14 242/604 |
| 9,126,800 B2 * | 9/2015 | Penunnatcha | .......... | B65H 75/14 |
| 9,494,757 B2 * | 11/2016 | Schomisch | .......... | G02B 6/3897 |
| 2002/0074462 A1 * | 6/2002 | Pontecorvo | .......... | B65H 75/366 248/89 |
| 2003/0230667 A1 * | 12/2003 | Ganster | .................. | B65D 85/04 242/613 |

(Continued)

FOREIGN PATENT DOCUMENTS

| | | |
|---|---|---|
| CH | 701475 | 1/2011 |
| EP | 2264502 | 12/2010 |

(Continued)

OTHER PUBLICATIONS

EU Search Report dated Feb. 28, 2020.

Primary Examiner — William E Dondero
(74) Attorney, Agent, or Firm — Sofer & Haroun, LLP

(57) ABSTRACT

A cable, cable component and reel arrangement includes a cable, at least one component, such as a cable component, configured to be employed in connection with the cable, and a reel, on which the cable is arranged, the reel having a barrel opening. The barrel opening includes a plurality of brackets, the brackets are arranged at spaced locations within the barrel opening and configured to support at least one component for storage and shipment.

5 Claims, 5 Drawing Sheets

(56) References Cited

U.S. PATENT DOCUMENTS

| | | | |
|---|---|---|---|
| 2008/0093187 A1* | 4/2008 | Roberts | B65H 75/22 191/12.2 R |
| 2009/0230228 A1* | 9/2009 | Penumatcha | B65H 75/14 242/395 |
| 2010/0090049 A1 | 4/2010 | Weissbrod | |
| 2013/0075522 A1* | 3/2013 | Penumatcha | B65H 75/14 242/614 |
| 2014/0001305 A1* | 1/2014 | Penunnatcha | B65H 75/14 242/604 |
| 2014/0161411 A1 | 6/2014 | Slater et al. | |
| 2015/0043882 A1 | 2/2015 | Schomisch et al. | |

FOREIGN PATENT DOCUMENTS

| | | |
|---|---|---|
| FR | 2814246 | 3/2002 |
| JP | 2003029053 | 1/2003 |
| WO | 2015086043 | 6/2015 |

\* cited by examiner

CABLE REEL WITH BARREL STORAGE

BACKGROUND

Field of the Invention

This application relates to a cable reel. More particularly, this application relates to a cable reel barrel and structure for storing related cable parts within the barrel.

Description of Related Art

Copper and fiber cables used in the telecommunication industry are often sold as a combination product/offering that includes both the cable component as well as separate complimentary components. These complimentary components may include, for example, bundled electronic/fiber optic equipment, connectors, jacks, plugs, patch panels, termination tools (crimpers, punch down tools, pulling eye, etc. . . . ), media converters, enclosures and other such equipment.

The sale of telecommunication products that include combined cables and equipment present problems regarding packaging, selling, shipping, and installing those products. For example, some of these problems relate to the fact that the separate components are typically packaged separately. The separate packages (i.e. reel and associated equipment boxes forming a two part "parcel") increase complexity in stocking and inventory management. Such an arrangement likewise can present issues with the customer's ability to specify and order the correct product. Additionally, during installation on the job site some of the rectangular component boxes can be separated from the correct cable reels they are associated with causing delays or even possibly mis-installation.

As a specific example, some power over Ethernet (PoE) extender systems/products are directed to PoE device(s) that are located more than 100 m away from the telecommunications closet. PoE extender systems may provide a customer a solution involving combinations of a PoE cable on a cable reel and an associated active electronic component that is shipped in a separate protective box. As noted above, they are packed separately, and the aim is to ship together. However, with two separate packages, there are inevitable circumstances where the package is separated from the reel during transit from packaging, storage, sale, shipping, delivery, job site arrival (generally), and ultimately installation.

OBJECT AND SUMMARY

The present arrangement looks to overcome the drawbacks associated with the prior art and to provide a combination cable reel and barrel, where the barrel is configured to have a bracket and support system for holding a separable package therein. The barrel, typically wooden, although possibly made of metal or sturdy plastic, not only acts as a single external carrier for both the cable and the package therein, but it also acts to further protect electronic equipment being shipped in the package stored therein.

To this end, a cable, cable component and reel arrangement includes a cable, at least one component, such as a cable component, configured to be employed in connection with the cable, and a reel, on which the cable is arranged, the reel having a barrel opening. The barrel opening includes a plurality of brackets, the brackets are arranged at spaced locations within the barrel opening and configured to support at least one component for storage and shipment.

BRIEF DESCRIPTION OF THE DRAWINGS

The present invention can be best understood through the following description and accompanying drawing, wherein.

DETAILED DESCRIPTION

Figure 1:
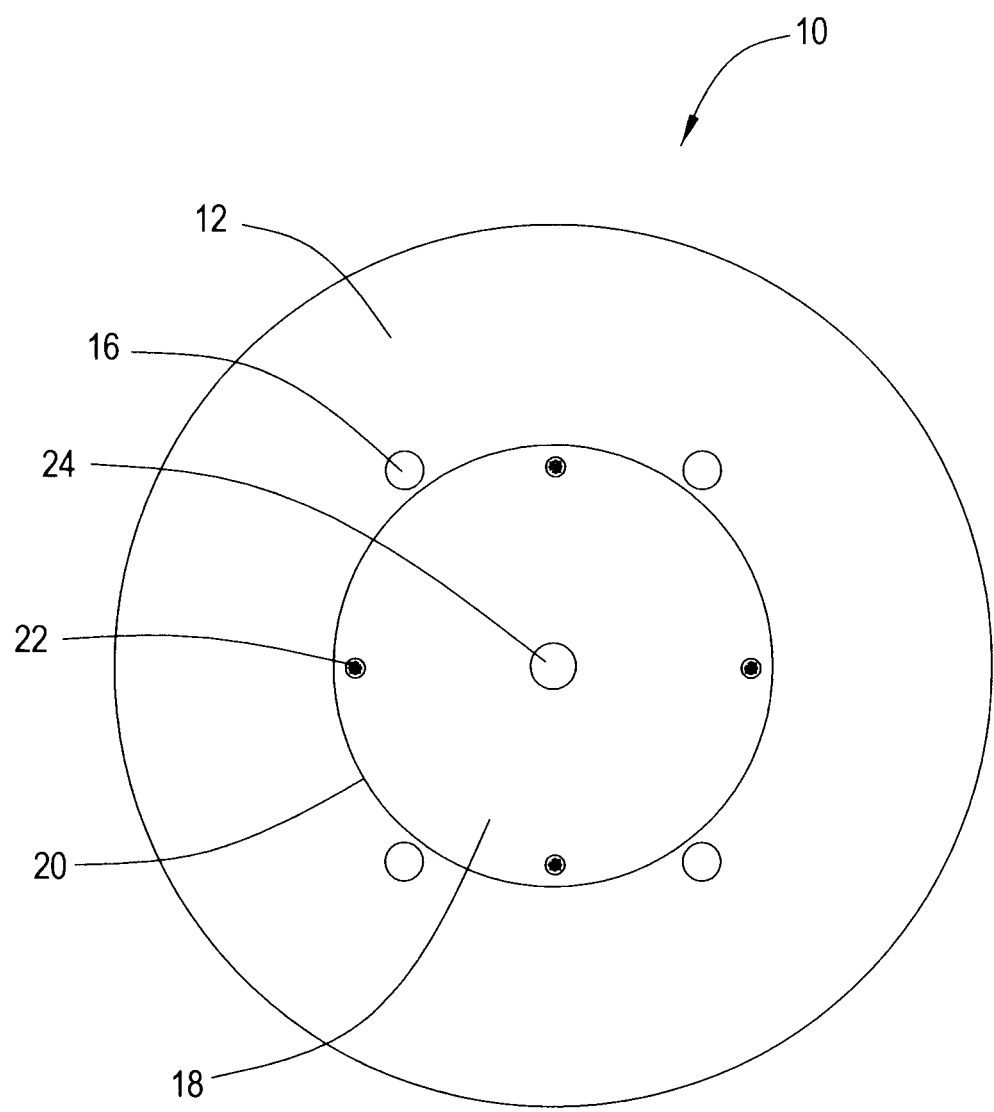
FIG. 1 is a side view of a cable reel with the barrel cover, in accordance with one embodiment.
Figure 2:
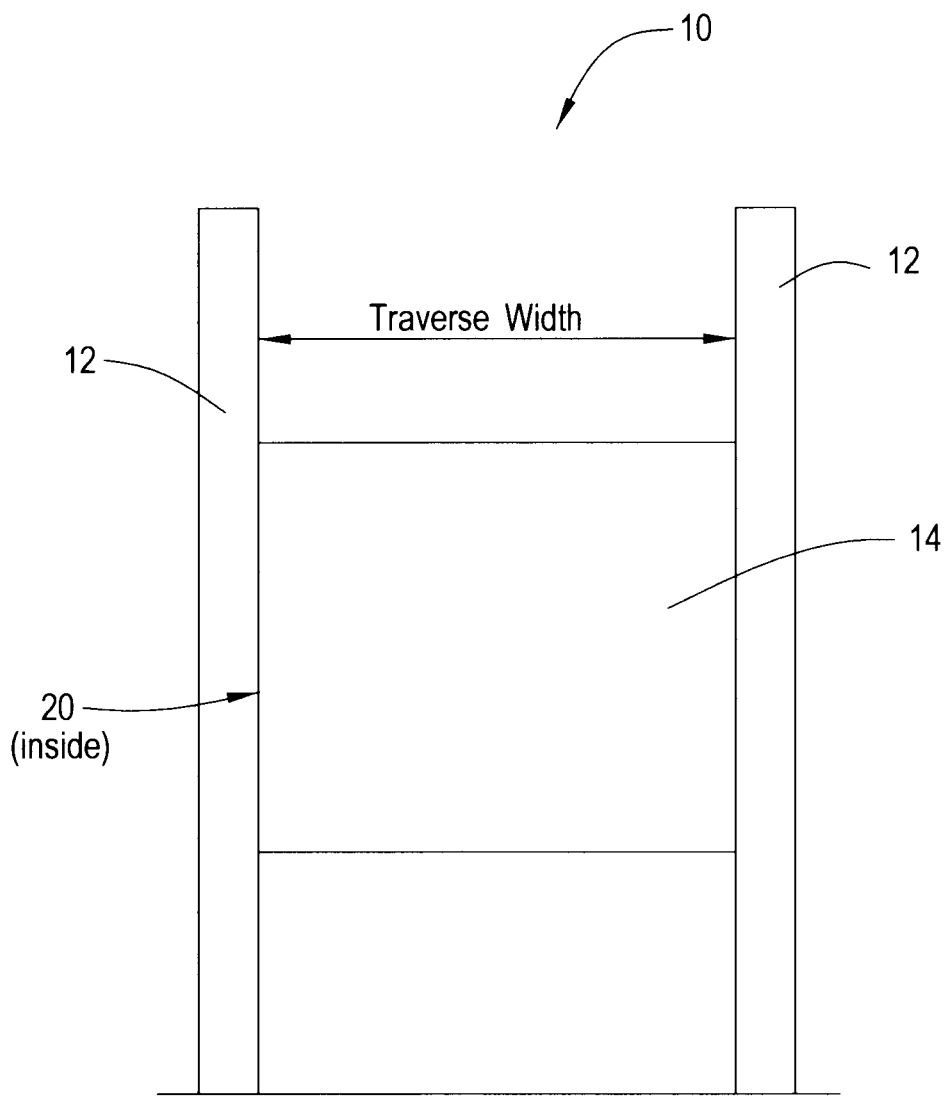
FIG. 2 is a front side view of the cable reel of FIG. 1, in accordance with another embodiment.

In one embodiment as shown in FIGS. 1 and 2, a cable reel 10 is shown. Cable reel 10 is ideally constructed of wood, but may otherwise be constructed of durable/rigid plastic or metal. Reel 10 is essentially constructed of two (2) flanges 12 and a hollow central barrel 14. The width of barrel 14 sets the traverse width of reel 10. Reel 10 is typically used for copper wire or fiber optic telecommunication cables, but the present reel 10 may be used in other applications as applicable.

As shown in FIG. 1, viewed from the side, one of two flanges 12 has four (4) connection bolts 16. Connection bolts 16, located on both sides of reel 10, couple hollow central barrel 14 and discs 12 to form reel 10. A barrel cover 18 may be screwed over a barrel opening 20 with cover screws 22 to form a continuous side panel for reel 10. An arbor hole 24 may be arranged in cover 18 for allowing reel 10 to be mounted onto an arbor (not shown) for winding and unwinding of cables thereon.

Figure 3:
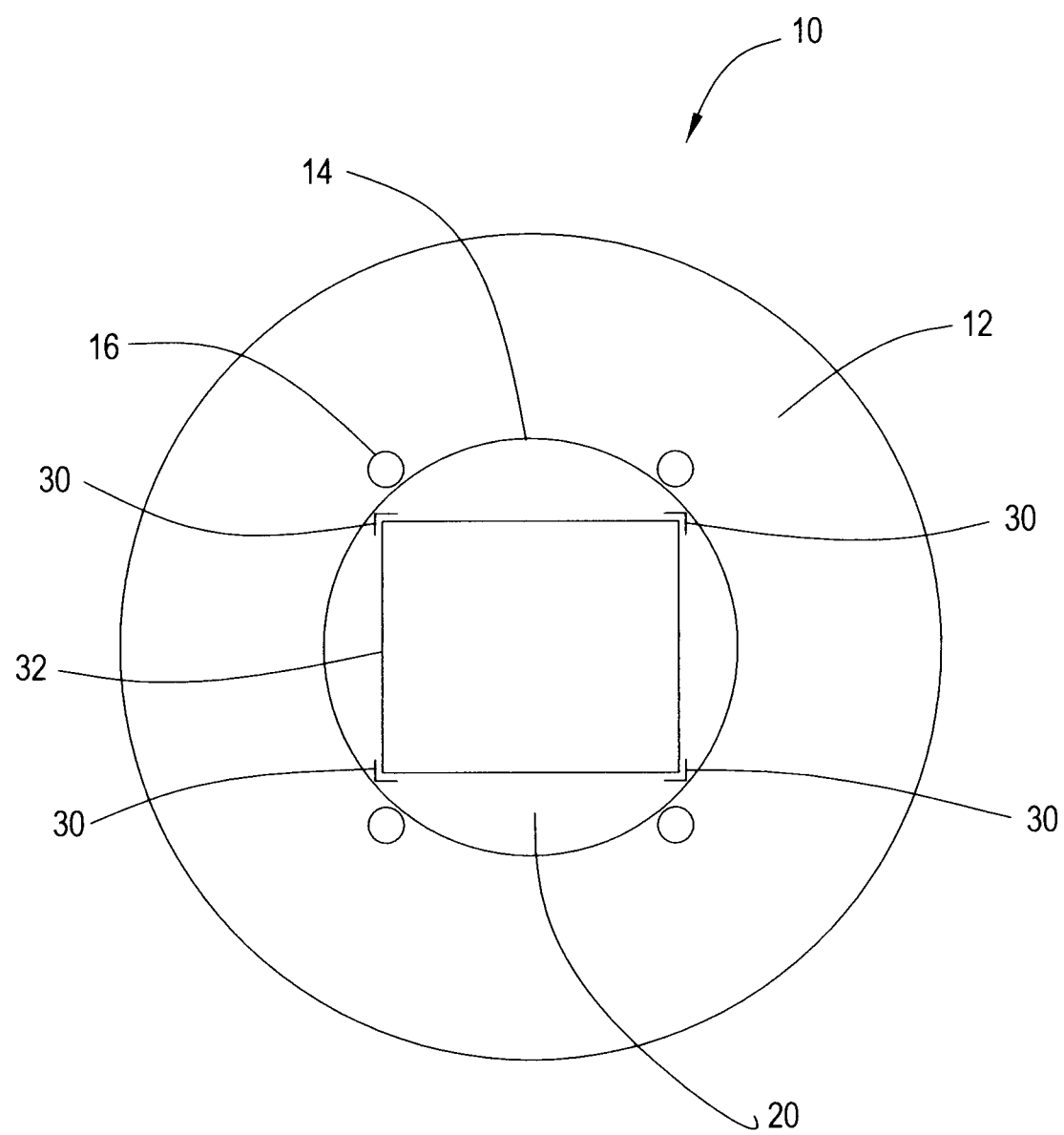
FIG. 3 is a side view of a cable reel with the barrel cover removed, in accordance with one embodiment.

In one arrangement as shown in FIG. 3, cover screws 22 are removed, removing barrel cover 18 and exposing the inside of barrel opening 20. As shown therein four brackets 30 are positioned with barrel opening 20 at locations supporting a rectangular package 32 therein.

In one embodiment, brackets 30 may be in the form of L-shaped brackets (e.g. angle iron) constructed from metal or plastic. Each of brackets 30 span at least partially across the internal width of barrel opening 20. In some cases bracket 30 can be nearly the entire width of barrel opening 20, and in some cases may be shorter, possibly spanning only ½ the internal width.

In the arrangement with shorter brackets 30, they would be less expensive, but in the case of longer width brackets 30 they would be able to support thinner-walled package material or no package at all (e.g. bubble wrap applied directly to the item being shipped. This would be similar to the prototype that was built).

In one embodiment, package 32 would typically not be secured directly to brackets 30, but the shape and sizing of package 32 can be such that it would not have a lot of room to move inside the enclosed dimensions of brackets 30 in directions perpendicular to the traverse length.

Figure 4:
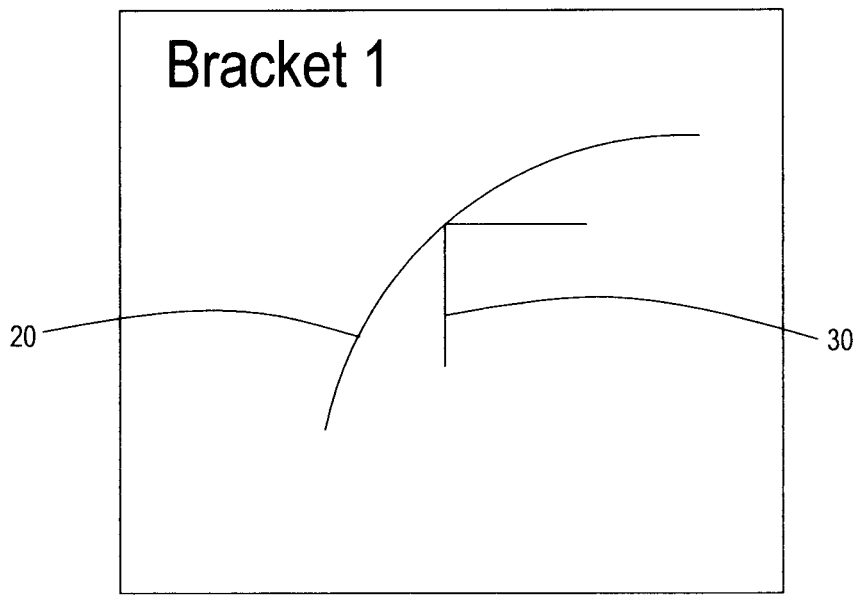
FIG. 4 is a close-up view of a barrel bracket used in the barrel of FIG. 1, in accordance with one embodiment.

As shown in FIG. 4 a first option shows a close up of angle brackets 30 attached to the inside of barrel opening 20. In this arrangement angle bracket 30 is coupled to the inside of barrel opening 20 either using glue, staples, screws or other types of fasteners.

Figure 5:
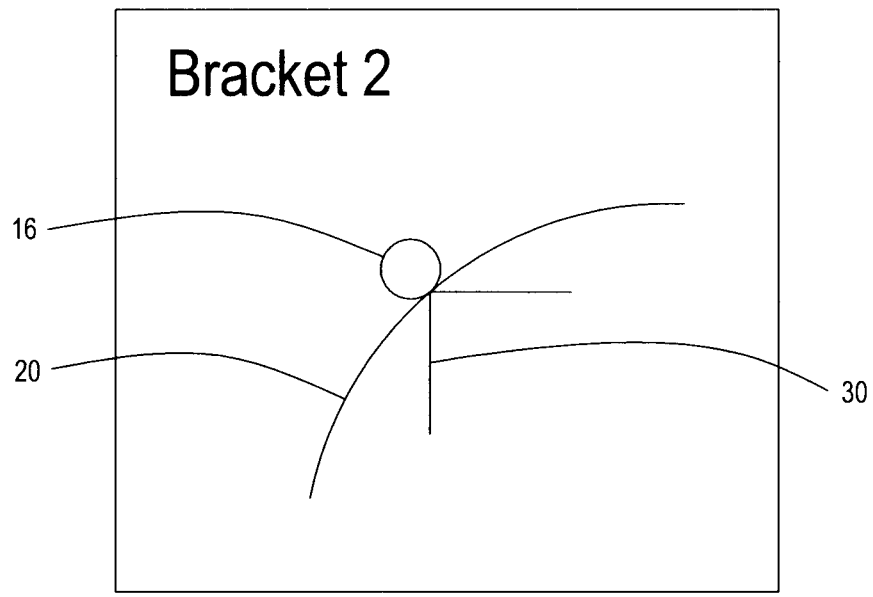
FIG. 5 is a close-up view of a barrel bracket used in the barrel of FIG. 1, in accordance with another embodiment.

In another arrangement as shown in FIG. 5 another option shows a close up of angle brackets 30 attached to the inside of barrel opening 20 by coupling to one of barrel connection bolts 16. In this arrangement angle bracket 30 is coupled to connection bolts 16. For example, bolts 16 may pass through or near the edge of barrel opening 20 in a manner supporting brackets 30. In this arrangement, brackets 30 may be constructed such that bracket 30 only supports package 32 at its four corners so that the brackets are aligned to easily accept the insertion of package 32. Brackets 30 could also be configured such that the circular holes for bolts 16 are between the circular arc of the barrel opening 20 and the lines intersecting at some angle.

Figure 6:
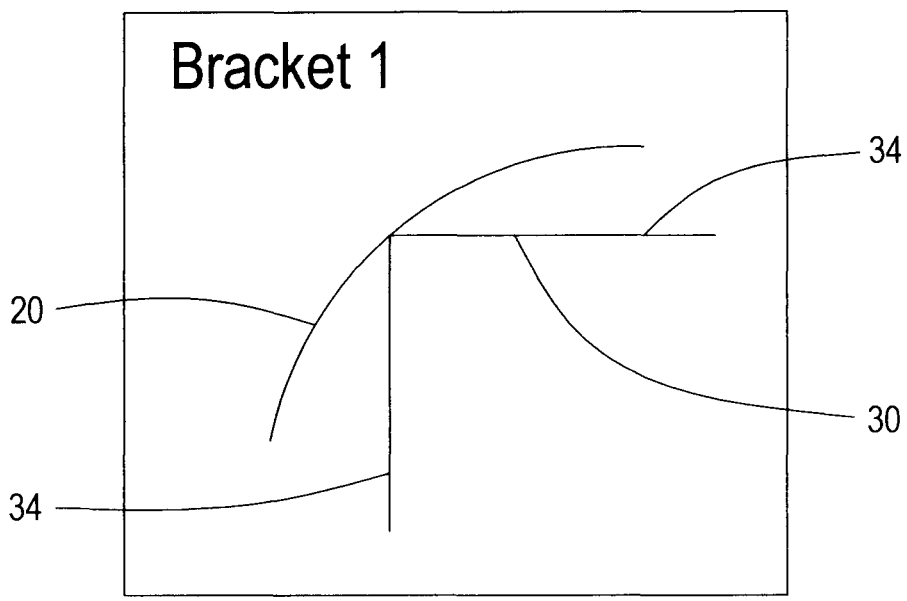
FIG. 6 is a close-up view of a barrel bracket used in the barrel of FIG. 1, in accordance with another embodiment.

As shown in FIG. 6 another option shows a close up of angle brackets 30 attached to the inside of barrel opening 20. In this arrangement angle bracket 30 is coupled to the inside of barrel opening 20 in the same manner as shown in FIG. 5, but in this arrangement brackets 30 have extended arms 34. Such an arrangement offers more rigidity on one or more sides compared to the others.

Figure 7:
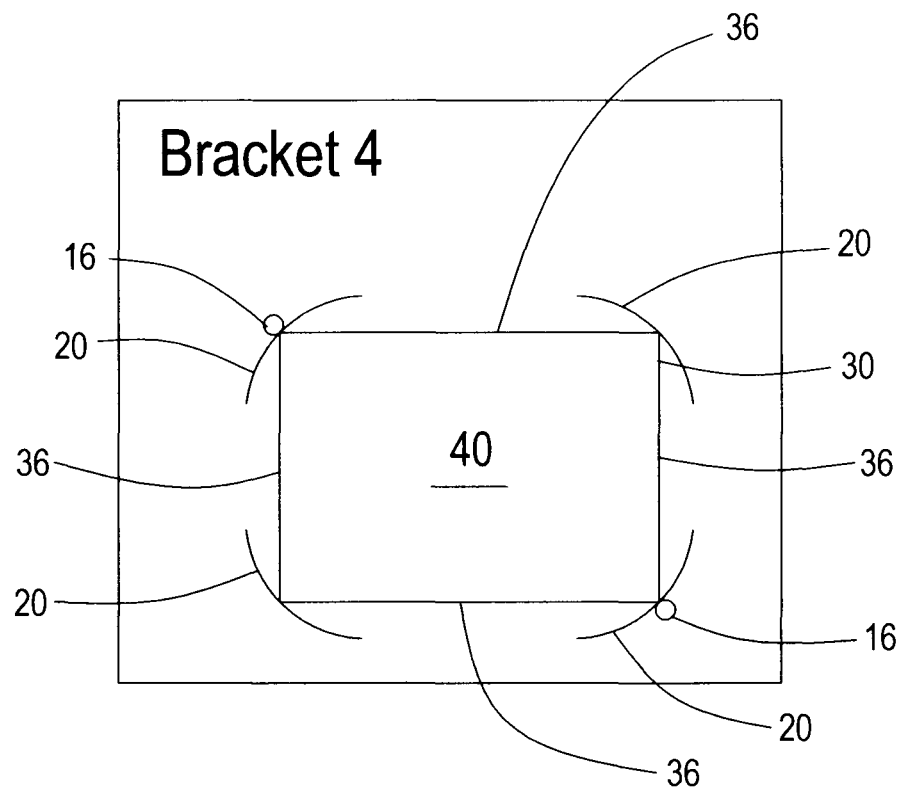
FIG. 7 is a close-up view of a barrel bracket used in the barrel of FIG. 1, in accordance with another embodiment.

As shown in FIG. 7 another option shows a close up of angle brackets 30 attached to the inside of barrel opening 20. In this arrangement angle bracket 30 is coupled to the inside of barrel opening 20 in the same manner as shown in either one of FIG. 5 or 6 (to the inside of barrel opening 20 or to connection bolts 16, but in this arrangement brackets 30 have extended arms 36 forming a complete rectangular frame 40. This arrangement may be used to provide a complete or near complete enclosure within barrel opening 20 to reduce or eliminate the packaging required to the co-shipped components reducing the immediate amount of waste on a jobsite that has to be removed (one less box that has to be broken down, taken to the dumpster and disposed). In some arrangements, rectangular frame 40 may traverse the entire width of barrel opening 20 or multiple structures 40 could be contained within the traverse width to support the package at multiple locations. The same is true for brackets: There could be a bracket 30 (frame part) at each end of each corner of frame 40 or multiple bracket parts 30 could be spaced throughout the traverse width on frame 40 to support the parts packages.

Applicants note that brackets 30 and the related structures in FIGS. 3-7 may be used on reel 10 with any number of connection bolts 16 to form any number of cross-sectional shapes, which include but are not limited to squares, rectangles, triangles, circles, ellipses, etc. . . . . . It is not necessary for all bolts 16 to be used to support brackets 30 or structures 40. Likewise, it is noted that barrel opening 20 of reel 10 does not have to be circular (i.e. could be rectangular barrel opening 20 (not shown)). In some cases with reels 10 made without any bolts 16 (i.e. barrel 20 is glued into groves in the inside sides of flanges 12), such brackets 30 and structure 40 described above are equally applicable, possibly by welding or gluing such components within said barrel opening 20.

While only certain features of the invention have been illustrated, and described herein, many modifications, substitutions, changes or equivalents will now occur to those skilled in the art. It is therefore, to be understood that this application is intended to cover all such modifications and changes that fall within the true spirit of the invention.

What is claimed is:

1. A cable, component, and reel arrangement comprising:
   a cable;
   at least one component; and
   a reel, on which said cable is arranged, said reel having a barrel, two flanges and a plurality of connection bolts holding said flanges to one another through said barrel forming said reel, said reel having a barrel opening, said component configured to be stored within said barrel opening of said reel,
   wherein said barrel opening includes a plurality of brackets, said brackets supported within said barrel opening by said plurality of connection bolts between said flanges, said brackets are arranged at spaced locations within said barrel opening and configured to support said at least one component for storage and shipment.

2. The arrangement as claimed in claim 1, wherein said at least one component is a cable component configured to be used in connection with said cable.

3. The arrangement as claimed in claim 1, wherein said reel includes two flanges and a hollow central barrel.

4. The arrangement as claimed in claim 1, wherein said barrel is covered by a barrel cover.

5. The arrangement as claimed in claim 4, wherein said barrel cover includes an arbor hole.

* * * * *